United States Patent
Hwang et al.

(10) Patent No.: US 11,082,856 B2
(45) Date of Patent: Aug. 3, 2021

(54) METHOD AND DEVICE FOR CONNECTING DEVICE IN SHORT-RANGE WIRELESS COMMUNICATION SYSTEM

(71) Applicant: Samsung Electronics Co., Ltd., Suwon-si (KR)

(72) Inventors: Sangho Hwang, Suwon-si (KR); Seonghee Park, Seoul (KR); Myounghwan Lee, Suwon-si (KR); Janghee Lee, Seongnam-si (KR); Chilyoul Yang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 16/481,963

(22) PCT Filed: Jan. 31, 2018

(86) PCT No.: PCT/KR2018/001355
§ 371 (c)(1),
(2) Date: Jul. 30, 2019

(87) PCT Pub. No.: WO2018/147592
PCT Pub. Date: Aug. 16, 2018

(65) Prior Publication Data
US 2019/0394818 A1    Dec. 26, 2019

(30) Foreign Application Priority Data
Feb. 9, 2017    (KR) .......................... 10-2017-0018341

(51) Int. Cl.
*H04W 12/55* (2021.01)
*H04W 76/14* (2018.01)
(Continued)

(52) U.S. Cl.
CPC ............. *H04W 12/55* (2021.01); *H04W 4/80* (2018.02); *H04W 8/005* (2013.01); *H04W 12/06* (2013.01);
(Continued)

(58) Field of Classification Search
CPC .... H04B 7/0413; H04M 1/7253; H04W 4/00; H04W 4/80; H04W 8/005; H04W 12/003;
(Continued)

(56) References Cited

U.S. PATENT DOCUMENTS

2004/0063452 A1    4/2004    Tomoda
2011/0151788 A1    6/2011    Castrogiovanni et al.
(Continued)

FOREIGN PATENT DOCUMENTS

EP    1 404 067 A2    3/2004
EP    2 733 888 A1    5/2014
(Continued)

OTHER PUBLICATIONS

European Search Report dated Dec. 12, 2019, issued in European Patent Application No. 18750791.8.

*Primary Examiner* — Khoa Huynh
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

According to the present invention, a method for connecting a first device in a short-range wireless communication
(Continued)

system comprises the steps of: transmitting, to a second device, a discovery signal including a connection information request; receiving, from the second device, a discovery response signal including information on a third device connected with the second device; and establishing a connection with the third device on the basis of the discovery response signal.

15 Claims, 15 Drawing Sheets

(51) Int. Cl.
    *H04W 4/80*         (2018.01)
    *H04W 8/00*         (2009.01)
    *H04W 40/24*       (2009.01)
    *H04W 72/04*       (2009.01)
    *H04W 12/06*       (2021.01)
    *H04W 12/50*       (2021.01)
    *H04B 7/0413*     (2017.01)

(52) U.S. Cl.
    CPC ......... *H04W 12/50* (2021.01); *H04W 40/246* (2013.01); *H04W 72/0406* (2013.01); *H04W 76/14* (2018.02); *H04B 7/0413* (2013.01)

(58) Field of Classification Search
    CPC ........... H04W 12/00305; H04W 12/06; H04W 72/0406; H04W 76/14; H04W 76/23; H04W 12/50; H04W 12/55; H04W 40/246

See application file for complete search history.

(56) References Cited

U.S. PATENT DOCUMENTS

| | | |
|---|---|---|
| 2012/0083208 A1 | 4/2012 | Giles et al. |
| 2014/0173108 A1 | 6/2014 | Lee et al. |
| 2016/0057796 A1 | 2/2016 | Kim et al. |
| 2016/0360345 A1 | 12/2016 | Kim et al. |
| 2017/0134927 A1* | 5/2017 | Lee .................. H04W 4/00 |
| 2017/0215113 A1 | 7/2017 | Lee et al. |
| 2017/0325161 A1 | 11/2017 | Kwon et al. |

FOREIGN PATENT DOCUMENTS

| | | |
|---|---|---|
| KR | 10-2014-0048930 A | 4/2014 |
| WO | 2009/003373 A1 | 1/2009 |
| WO | 2010/000293 A1 | 1/2010 |
| WO | 2015/069030 A1 | 5/2015 |
| WO | 2015/194854 A1 | 12/2015 |
| WO | 2016/017909 A1 | 2/2016 |
| WO | 2017/018604 A1 | 2/2017 |

* cited by examiner

METHOD AND DEVICE FOR CONNECTING DEVICE IN SHORT-RANGE WIRELESS COMMUNICATION SYSTEM

TECHNICAL FIELD

The disclosure relates to a method for establishing a connection between devices in a short range wireless communication system and, in particular, to a method and apparatus for a device to establish a connection with one of other devices connected with each other.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As a fundamental part of such communication systems, a conventional short range wireless communication system is inconvenient for establishing a connection between master and slave devices. Particularly in the case of being required to connect a new master device to a slave device that always has a connection with another master device, it is inevitable to release the previously established connection to establish a new connection, which is inconvenient.

DISCLOSURE OF INVENTION

Technical Problem

The disclosure provides a method and apparatus for allowing a user to establish a new connection between two devices, of which one already has an old connection established with another device, through a short range wireless communication link without releasing the old connection.

Solution to Problem

According to an embodiment of the disclosure, a connection method of a first device in a wireless communication system includes transmitting a discovery signal including a connection information request to a second device, receiving a discovery response signal including information on a third device connected to the second device from the second device, and establishing a connection to the third device based on the discovery response signal.

According to an embodiment of the disclosure, a first device in a short range wireless communication system includes a transceiver configured to transmit a discovery signal including a connection information request to a second device and receive a discovery response signal including information on a third device connected to the second device from the second device and a controller configured to control to establish a connection to the third device based on the discovery response signal.

Advantageous Effects of Invention

The disclosure is advantageous in terms of improving a user's convenience of using a short range wireless communication system with automatic inter-device connectivity and connectable device list organization functions as well as making it possible to establish a new connection between two devices, of which one already has an old connection established with another device, without releasing the old connection

MODE FOR THE INVENTION

Figure 1:
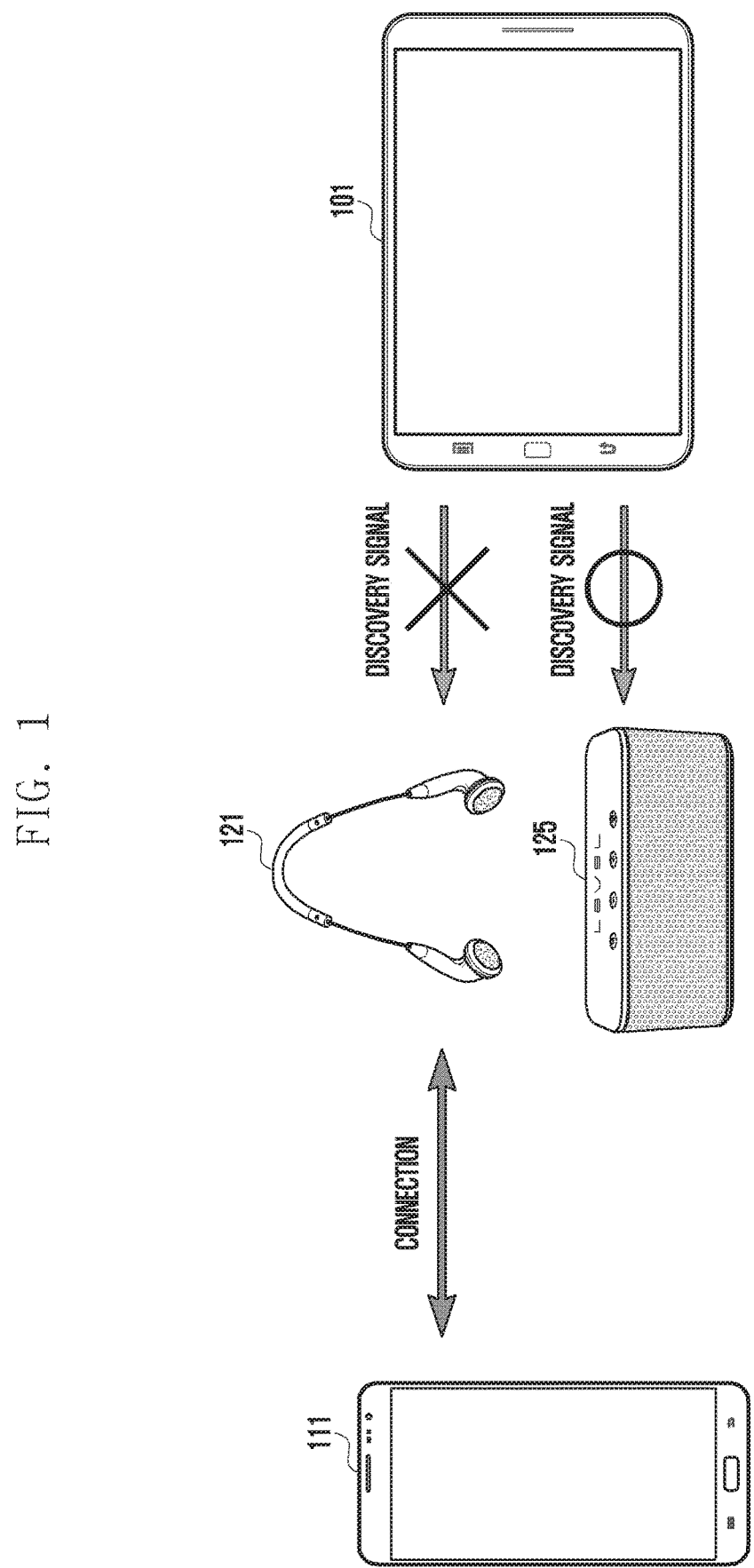
FIG. 1 is a diagram for explaining a method for establishing a connection between devices according to a conventional technology.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

In a short range wireless communication system, devices connected via a short range wireless communication system are divided into master and slave devices. A master device is a host device that is capable of controlling establishment of a connection with another device; examples of the master device include a portable phone and a laptop computer.

Meanwhile, a slave device is a peripheral device that connects to the master device under the control of the master device. Examples of the slave device include a Bluetooth earphone and a Bluetooth keyboard.

There can be multiple master devices and multiple slaves, and a device, such as a Bluetooth earphone, that can be controlled to establish a connection with another device may simultaneously operate as a master device and a slave device.

The disclosure is directed to a situation where there are first and second devices as master devices and a third device as a slave device for convenience of explanation. However, as aforementioned, all of the first to third devices may each operate as a master device and a slave device simultaneously.

FIG. 1 is a diagram for explaining a method for establishing a connection between devices according to a conventional technology.

In FIG. 1, there are a Bluetooth earphone 121 and a Bluetooth speaker 125 as examples of a third device, and a second device 111 is connected to the Bluetooth earphone 121.

In this situation, a first device 101 broadcasts a discovery signal to search for connectable devices and establishes a connection to one of discovered devices.

In this case, the Bluetooth speaker 125 that has no connection with any device may transmit a discovery response signal in reply to the discovery signal broadcast by the first device 101. As a consequence, the first device 101 may establish a connection with the Bluetooth speaker 125 based on the discovery response signal.

Meanwhile, the Bluetooth earphone 121 cannot respond to the discovery signal from the first device 101 because it has a connection established with the second device 111. Accordingly, the Bluetooth earphone 121 cannot establish a connection with the first device 101.

This means that, in order to establish a connection between the first device 101 and the Bluetooth earphone 121, it is necessary to go through a complex and inconvenient process of operating the second device 111 to release the connection between the second device 111 and the Bluetooth earphone 121 and then operating the first device 101 to establish a connection between the first device 101 and the Bluetooth earphone 121.

In order to overcome this inconvenience of the conventional method, the disclosure proposes a method for the first device to establish a connection to the third device via the second device having a connection previously established with the third device. That is, the disclosure proposes a method for the first device to establish a connection with the third device without exchanging any signals with the third device.

Figure 2:
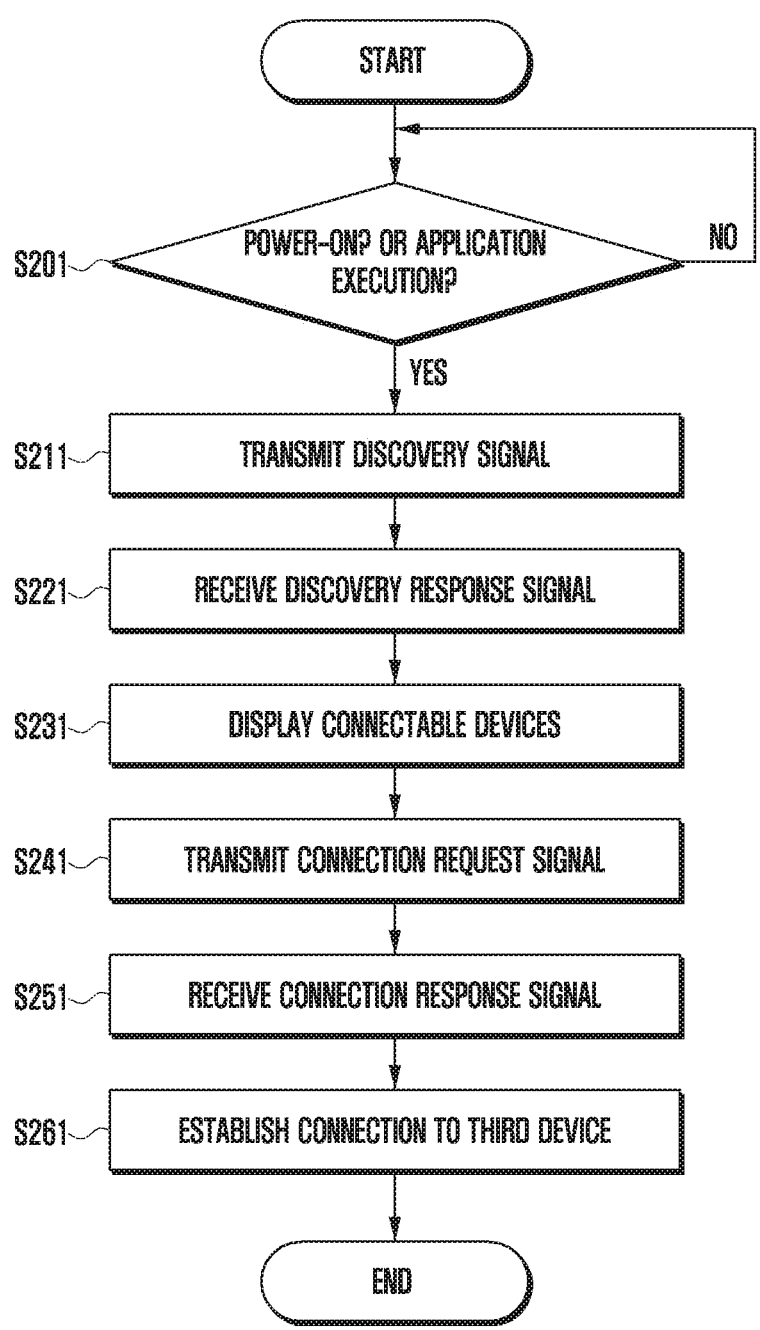
FIG. 2 is a flowchart illustrating a method for establishing a connection between devices in a short range wireless communication system according to an embodiment of the disclosure.

FIG. 2 is a flowchart illustrating a method for establishing a connection between devices in a short range wireless communication system according to an embodiment of the disclosure.

As described above, the first device broadcasts a discovery signal to search for devices around the first device. Typically, the discovery signal is broadcast under the control of the first device for the case where it is necessary to connect the first device to another device.

In the disclosure, the discovery signal may be broadcast at step S211 when the first device powers on or an application is executed on the first device at step S201.

In detail, if the first device is powered on for use at step S201, it may need a device for its operation and thus broadcast a discovery signal at step S211; if a predetermined application (music application or text-editing application as to be described later) is executed at step S201, it may need a device for an operation or use of the application and thus broadcast a discovery signal at step S211. That is, if a trigger event such as power-on of the device and execution of application occurs, a discovery signal may be broadcast at step S211.

Unlike the conventional technology, the second device having no connection established with the third device may transmit a response signal in reply to the discovery signal from the first device. In this case, the discovery signal may include a connection information request.

The connection information request may include type information of a device to which the first device aims to connect. Here, the type information of the device is information for determining whether a device to which the first device aims to connect is a target device.

For example, if the first device is a laptop computer and broadcasts a discovery signal to search for a device necessary for a document work, the device type information may be information indicative of a Bluetooth keyboard or a Bluetooth mouse.

The connection information request may also include the first device's name, type, Bluetooth address, and account information, and the discovery signal may further include information on a service in use by the first device.

At step S221, the first device receives a discovery response signal including information on the third device connected to the second device from the second device. That is, the first device acquires the information on the third device for use in establishing a connection with the third device from the second device with no signal exchange with the third device.

The discovery response signal may include various kinds of information such as type of the third device. The discovery response signal may also include a Bluetooth address and account information of the third device.

The discovery response signal may also include a Bluetooth address and account information of the second device, because it is a signal being transmitted from the second device to the first device, as well as the information on the third device.

Although not shown in FIG. 2, the procedure may include a step for the first device to perform an operation of authenticating the third device after step S221. However, if the discovery signal and the discovery response signal include the same account information of the first device, the authentication step may be omitted because there is no need to perform the authentication step.

After step S211, the first device displays at least one device, at step S231, to which the first device can establish a connection. According to the disclosure, the at least one device to which the first device can connect may be displayed in various manners and, in particular, the first electronic device may display at least one device connected to the second device in the form of a list.

For example, if there are multiple third devices connected to the second device, the first device may display the multiple third devices connected to the second device in the form of a list. If there are multiple second devices, the first device may also display the multiple devices connected to each second device in the form of a list.

FIGS. 3 to 9 are diagrams illustrating how the first device displays a list according to an embodiment of the disclosure.

Figure 3:
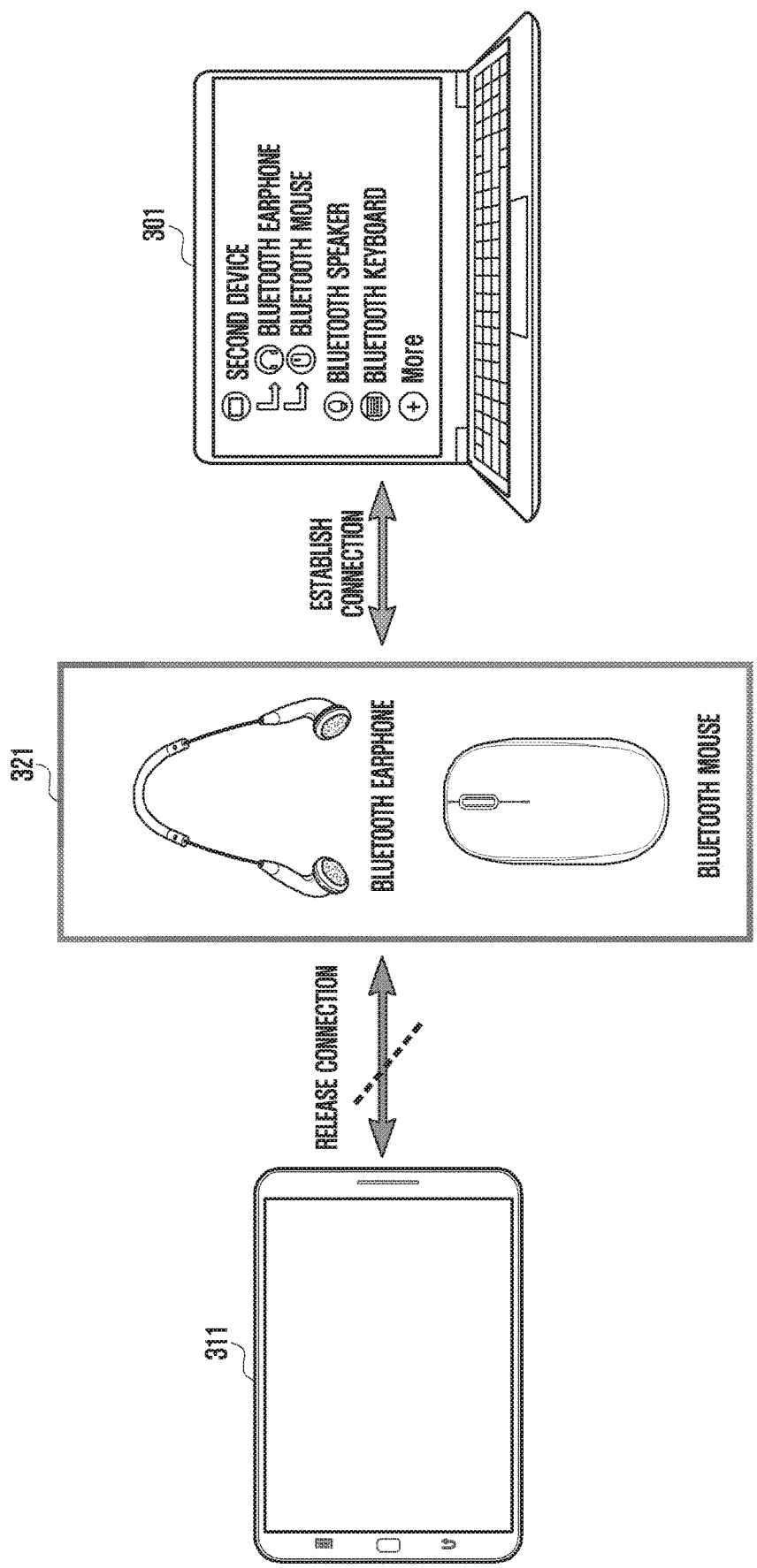
FIGS. 3 to 9 are diagrams illustrating how the first device displays a list according to an embodiment of the disclosure.

In FIG. 3, a Bluetooth earphone and a Bluetooth mouse are depicted as examples of third devices 321, and both the Bluetooth earphone and Bluetooth mouse are connected to a second device 311.

In this case, the Bluetooth earphone and Bluetooth mouse are displayed on a first device 301 as the devices connected to the second device 311 in FIG. 3. There may be other devices (Bluetooth speaker and Bluetooth keyboard in the case of FIG. 3) as well as the third devices 321, and a list displayed by a first device 301 may contain the other devices as well as the third devices 321

Although to be described later, if the Bluetooth mouse and the Bluetooth earphone as the third devices 321 are selected as connection targets, a connection between the second device 311 and the third devices 321 may be released, and a new connection between the first device 301 and the third devices 321 may be established.

Figure 4:
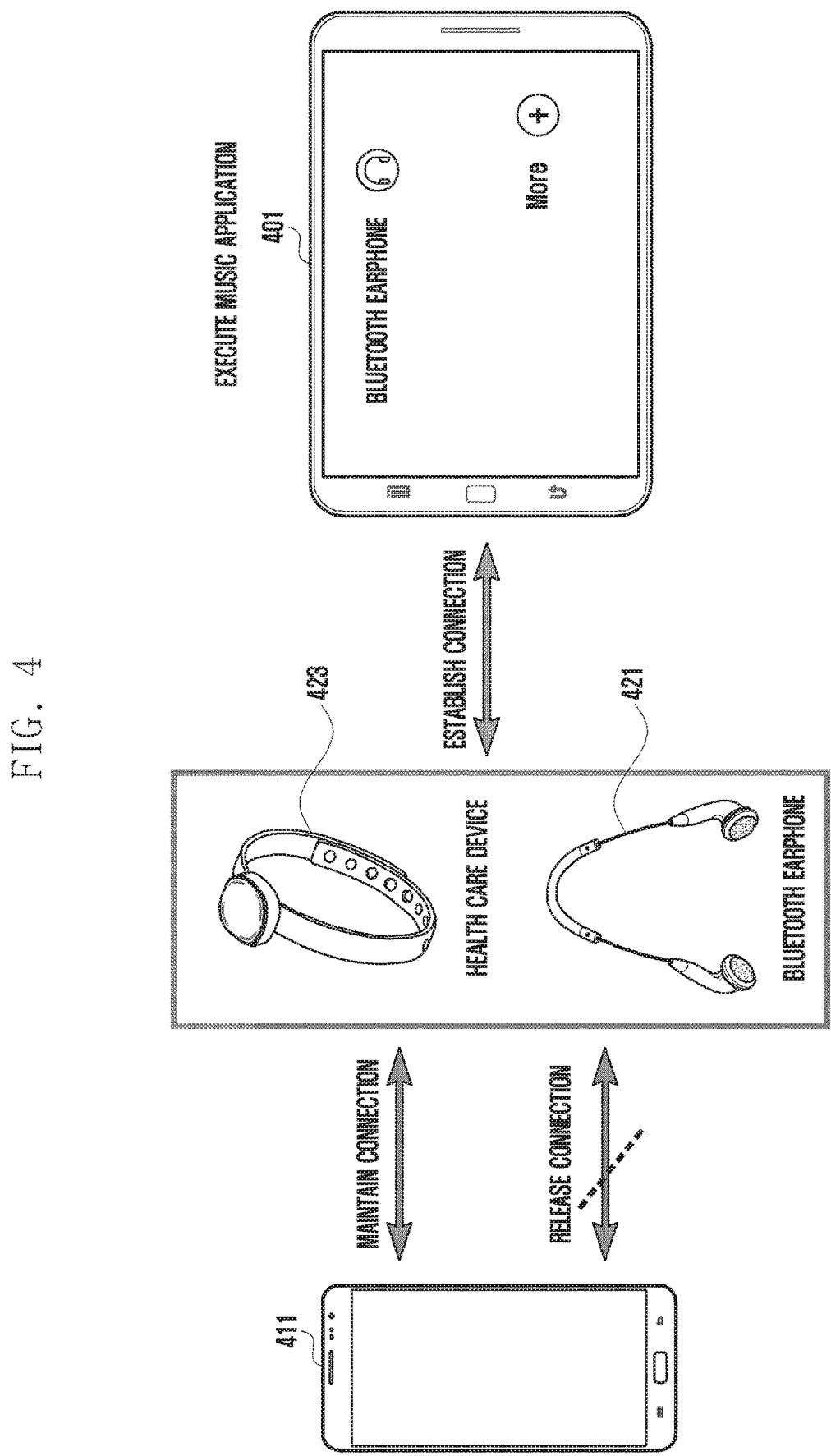

FIG. 4 is a diagram illustrating a situation where a list of devices sorted by relevance to an application executed in a first device 401 is displayed according to an embodiment of the disclosure.

In this embodiment, a health care device 423 capable of counting heart rate and a Bluetooth earphone 421 as third devices are connected to a second device 411, and a music application is executed on the first device 401.

In this case, the health care device 423 has a lower relevance to the music application than that of the Bluetooth earphone 421 and thus is ranked below the Bluetooth earphone 421 in the list displayed on the first device 410. As shown in FIG. 4, the health care device 423 may be excluded from the list of the first device.

The relevance of a third device to the application executed on the first device may be determined by comparing a category of the third device and a category of the application. A category denotes a field in which the third device or the application is classified, and both the Bluetooth earphone and the music application may fall in the music category.

Accordingly, the relevance between the third device and the application is high for the case where they fall in the same category and low for the case where they fall in different categories.

Although to be described later, if the Bluetooth earphone 421 is selected as a connection target of the first device 401, a connection between the second device 411 and the Bluetooth earphone 421 may be released, and a new connection may be established between the first device 401 and the Bluetooth earphone 421.

Meanwhile, because the health care device 412 is not a connection target of the first device, it may maintain a connection established with the second device 411 as shown in FIG. 4.

Figure 5:
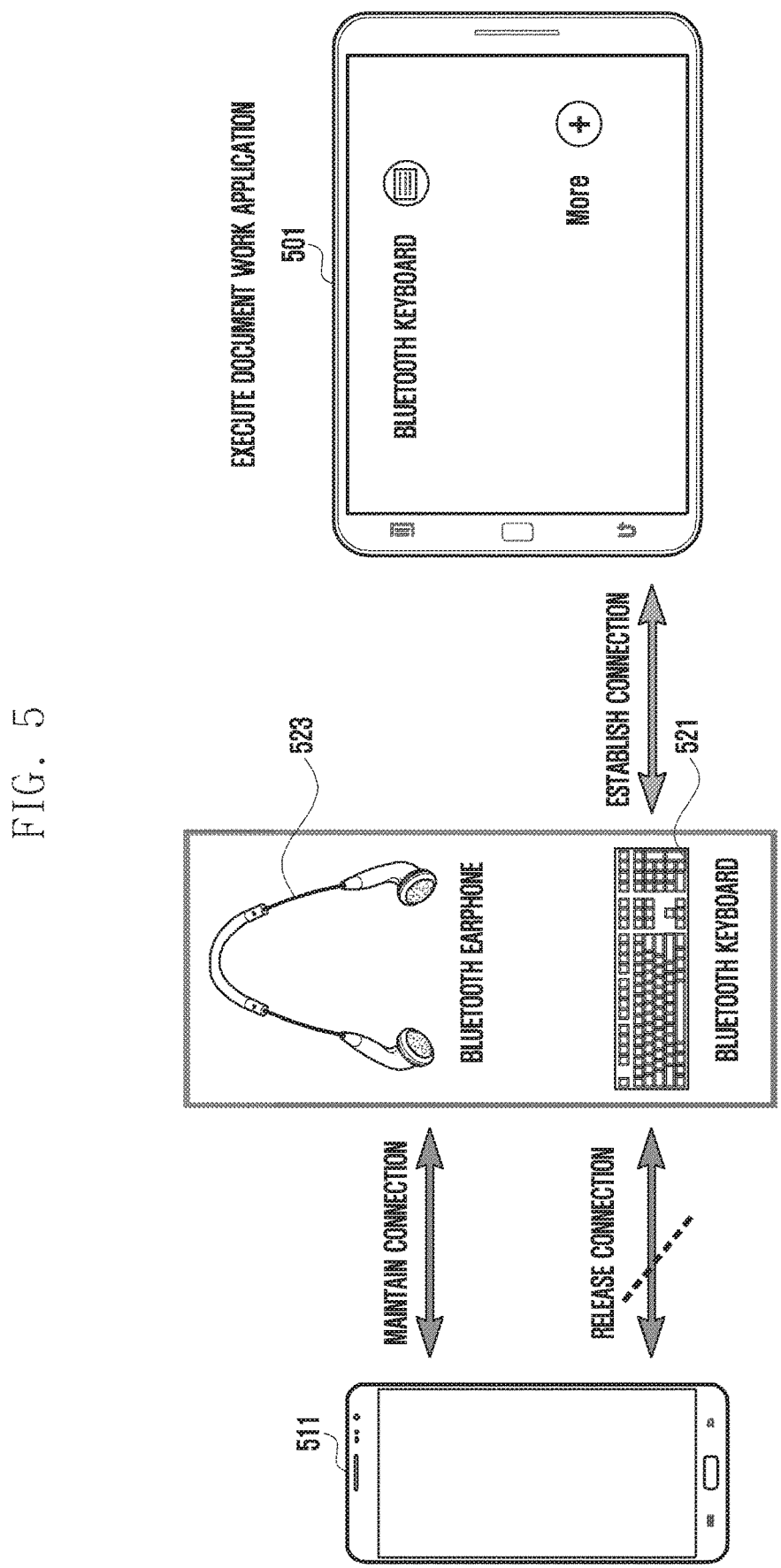

FIG. 5 is a diagram illustrating a situation where a text-editing application is executed on a first device according to an embodiment of the disclosure.

That is, a Bluetooth earphone 523 and a Bluetooth keyboard 421 as third devices are connected to a second device 511, and an application related to a document work is executed in the first device 501.

In this case, the Bluetooth keyboard 521 may be ranked above the Bluetooth earphone 523 in a list displayed, as in FIG. 4, on the first device 501 (or the Bluetooth earphone 523 may be excluded from the list as shown in FIG. 5).

Afterward, if the Bluetooth keyboard 521 is selected as a connection target of the first device 501, the connection between the second device 511 and the Bluetooth keyboard 521 may be released, and a new connection may be established between the first device 501 and the Bluetooth keyboard 521. Meanwhile, the Bluetooth earphone 523 may maintain the connection to the second device 523.

Figure 6:
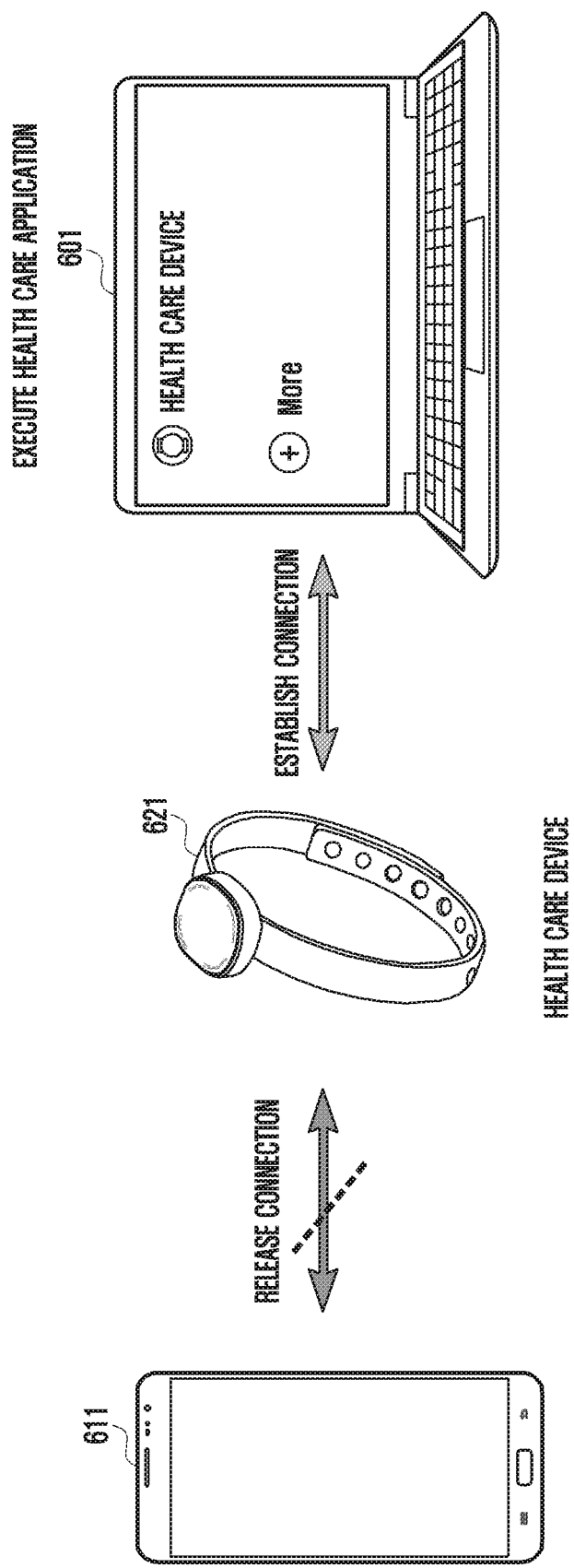

FIG. 6 is a diagram illustrating a situation where a health care application is executed on a first device 601 according to an embodiment of the disclosure.

In this case, as described with reference to FIGS. 4 and 5, a health care device 621 connected to a second device 611 may be ranked high in a list displayed on the first device 601; if the health care device 621 is selected as a connection target of the first device 601, the connection between the health care device 621 and the second device 611 may be released, and a new connection may be established between the first device 601 and the health care device 621.

Figure 7:
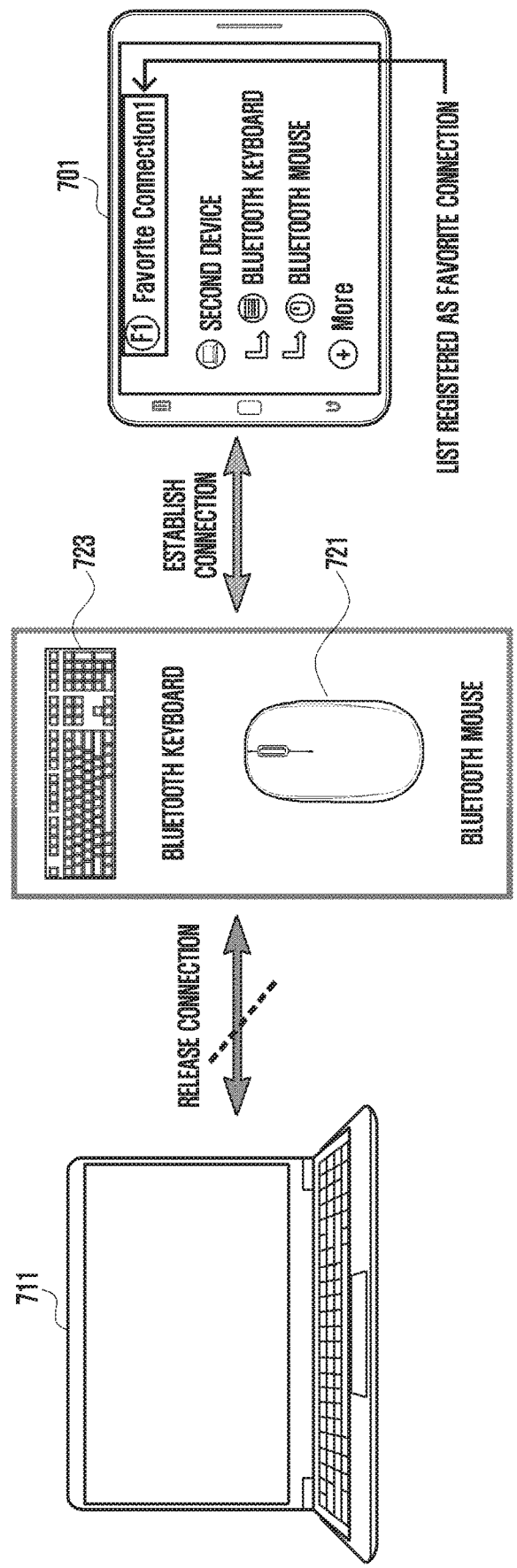

FIG. 7 is a diagram illustrating a situation where a list of devices preregistered with a first device 701 is displayed according to an embodiment of the disclosure.

A device that is frequently connected to the first device 701 according to the nature of the device may be previously registered with the first device. In this case, a preregistered device list may be separately displayed along with a list of third devices for communication with the second device 711 as shown in FIG. 7.

Although dubbed as "Favorite connection" in FIG. 7, the list just means a list of devices preregistered with the first device 701, and the claim is not limited by by its name.

Figure 8:
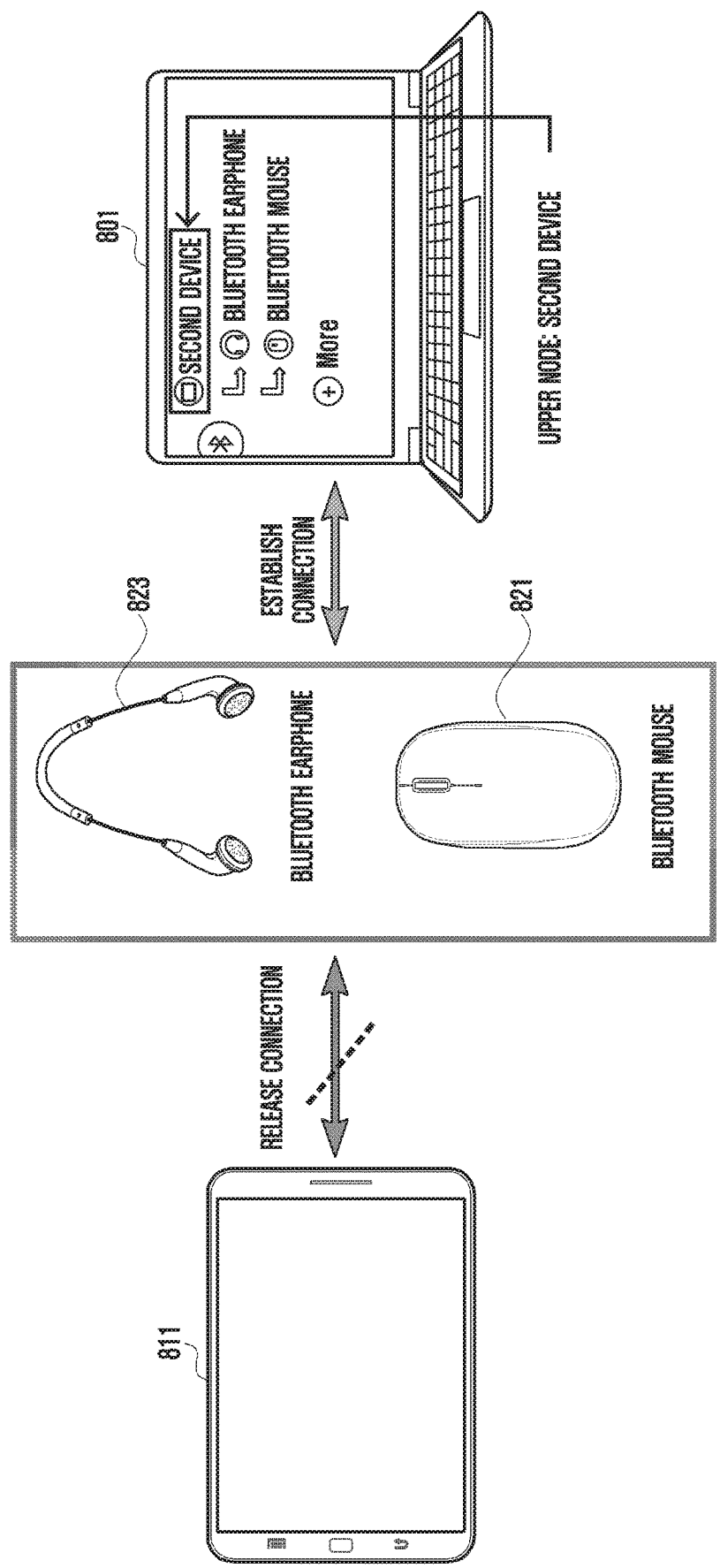

FIG. 8 is a diagram illustrating a situation where a list of devices connectable to a first device 801 using a second device 811 as an upper node is displayed according to an embodiment of the disclosure.

According to the disclosure, a plurality of devices connected to the second device 811 may be displayed in a tree structure. In FIG. 8, for example, if a Bluetooth mouse 831 and a Bluetooth earphone 823 are connected to the second device 811, the first device 801 may display a tree structure composed of an upper node of the second device 811 and lower nodes of the Bluetooth mouse 821 and the Bluetooth earphone 823 as lower nodes connected to the second device 811.

In this case, if the second device 811, i.e., upper node, is selected as a connection target of the first device 801, connections of the Bluetooth mouse 821 and the Bluetooth earphone 823, i.e., lower nodes to the second device 811, are all released, and new connections to the first device 801 are established.

Although one second device as an upper node and the Bluetooth earphone and mouse as lower nodes are shown in FIG. 8, there may be multiple devices classified as upper nodes. It may also be possible that the tree structure has three or more hierarchical levels rather than two (upper node and lower node).

Figure 9:
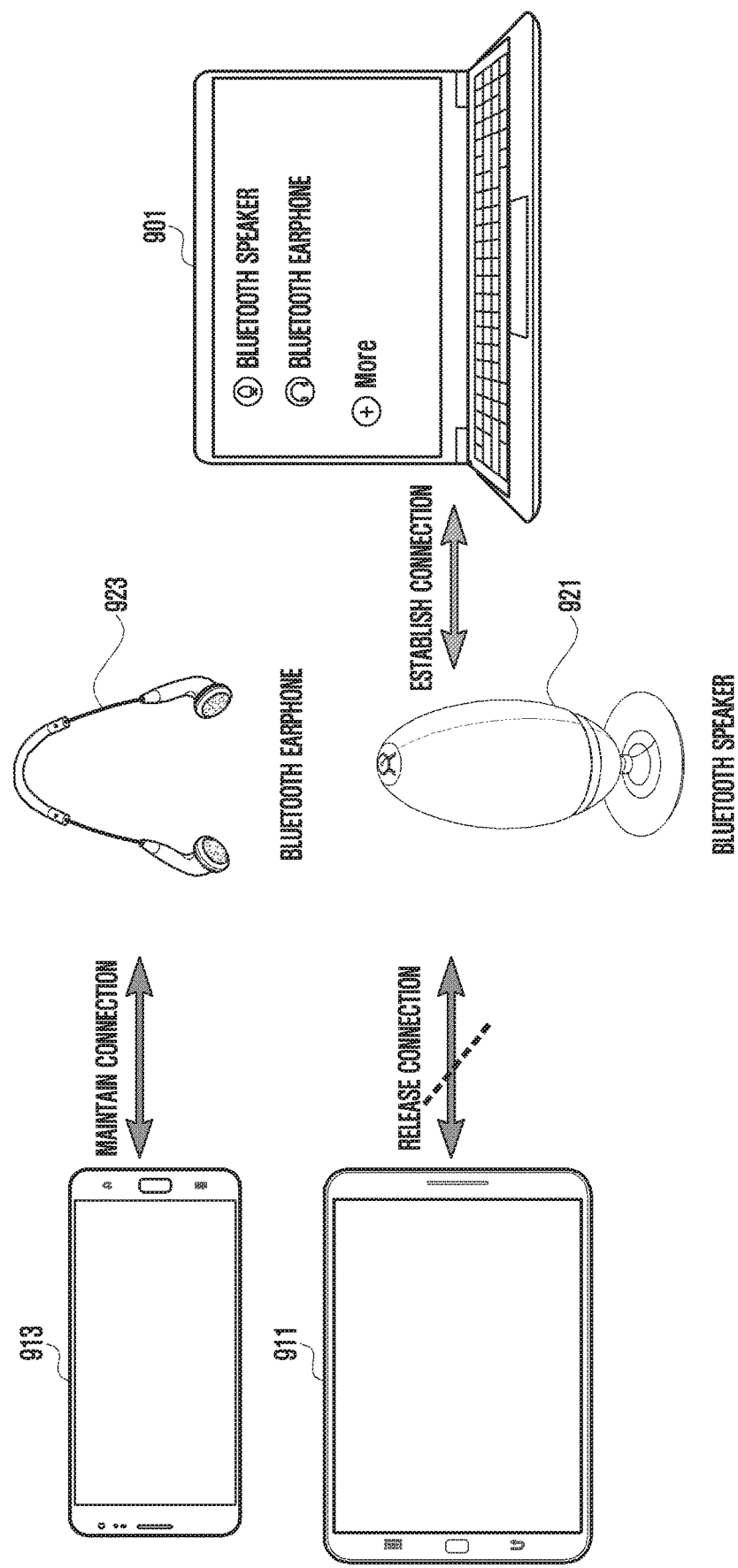

FIG. 9 is a diagram illustrating a situation where a list is configured according to capabilities of third devices according to an embodiment of the disclosure.

If a music application is executed on a first device 901 as described with reference to FIG. 4, it may become necessary to establish a connection to a device related to a music application, e.g., Bluetooth speaker 921 and Bluetooth earphone 923.

In the embodiment of FIG. 9, the Bluetooth speaker 921 that is superior in performance to the Bluetooth earphone 923 may be ranked higher in a list displayed on the first device 901.

If the Bluetooth speaker 921 is selected as a connection target of the first device 901, a connection established between the Bluetooth speaker 921 and the second device 911 may be released, and a new connection may by established between the Bluetooth speaker 921 and the first device 901.

Meanwhile, a connection that has been previously established between the unselected Bluetooth earphone 923 and the second device 913 may be maintained.

After performing the operation of step 231 as described above, if a second device is selected as a connection target of the first device, the first device transmits a connection request signal to the second device at step S241.

That is, the first device transmits a signal including information necessary for connection with the third device to the second device. Because the first device has acquired the basic information on the second and third devices by exchanging discovery signals, the connection request signal may include the least information necessary for establishing a connection between the first and third devices (e.g., Bluetooth address of the third device).

After step 241, the first device may receive a connection response signal, at step S251, from the second device in response to the connection request signal; it may be preferable to include the least information necessary for establishing the connection between the first and third devices in the connection response signal as in the connection request signal in view of power consumption of the first and second devices.

After step S251, the first device establishes a connection with the third device at step S261 based on the connection response signal. If the connection between the first and third devices is established the old connection between the second and third devices is released as described with reference to FIGS. 3 to 9.

The method of establishing a connection between devices may be implemented according to various embodiments including the embodiment of FIG. 2, e.g., an embodiment in which step S231 of FIG. 2 is omitted.

In this case, after receiving the discovery response signal at step S221, if the type of device that is indicated in the discovery signal as a connection target of the first device matches the type of the third device that is included in the discovery response signal, the first device automatically performs step S241.

In this case, the first device may automatically establish a connection with a target device without any control intervention, which leads to improvement of a user's convenience of using a short range wireless communication system.

Various embodiments may be derived from the embodiment of FIG. 2 depending on the characteristics of devices in use.

Figure 10:
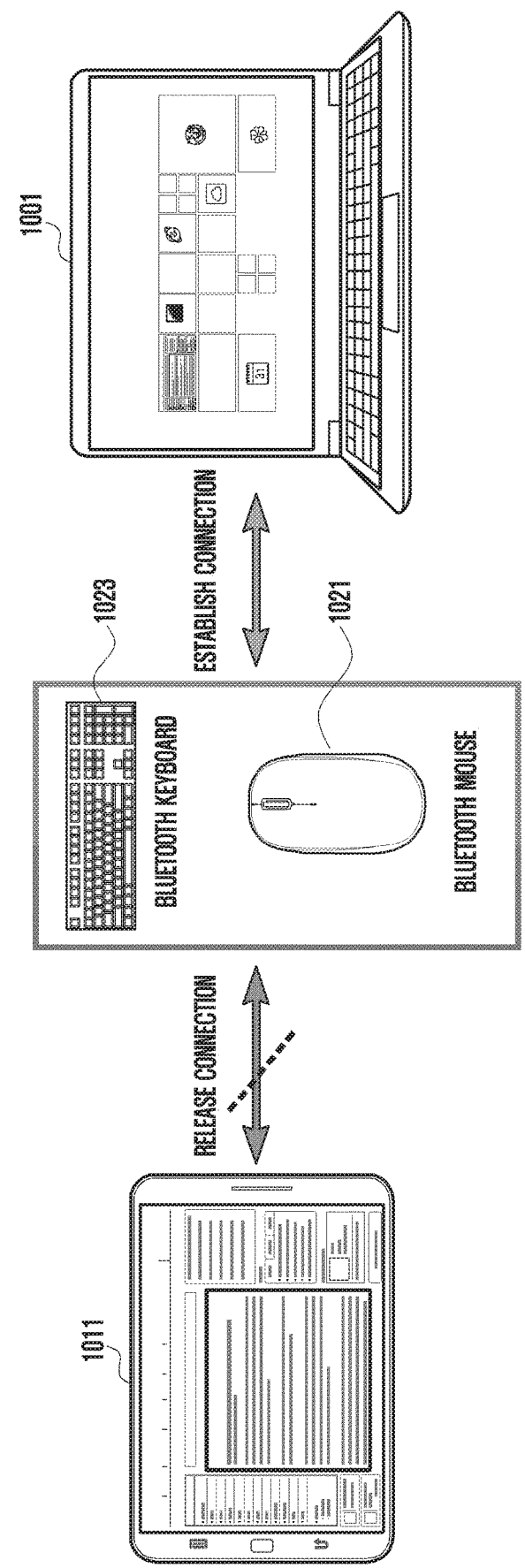
FIGS. 10 and 11 are diagrams for explaining a method for establishing a connection between devices according to an embodiment of the disclosure.

FIG. 10 is a diagram illustrating a situation where a first device 1001 is handed a task running on a second device 1011 seamlessly according to an embodiment of the disclosure.

In detail, it is intended to hand over a document work that is in progress with the use of a Bluetooth mouse 1021 and a Bluetooth keyboard 1023 on the second device 1011 to the first device 1001 to continue the document work seamlessly.

In this case, the first device 1001 may be controlled such that the work in progress on the second device 1011 is to be seamlessly performed on the first device 1001 along with connecting the Bluetooth mouse 1021 and the Bluetooth keyboard 1023 to the first device 1001 according to the control method described with reference to FIG. 2.

As described with reference to FIG. 2, the first device transmits discovery signals, receives discovery response signals, and establishes connections to the Bluetooth mouse 1021 and the Bluetooth keyboard 1023 based on connection request signals and connection response signals exchanged based thereon.

In this case, by controlling only the device for use in continuing the document work, i.e., the first device 1001, it becomes possible to connect the Bluetooth mouse 1021 and the Bluetooth keyboard 1023 to the first device 1001 as well as to release old connections between the second device 1011 and the Bluetooth mouse 1021 and the Bluetooth keyboard 1023, thereby continuing the document work on the first device 1001.

Figure 11:
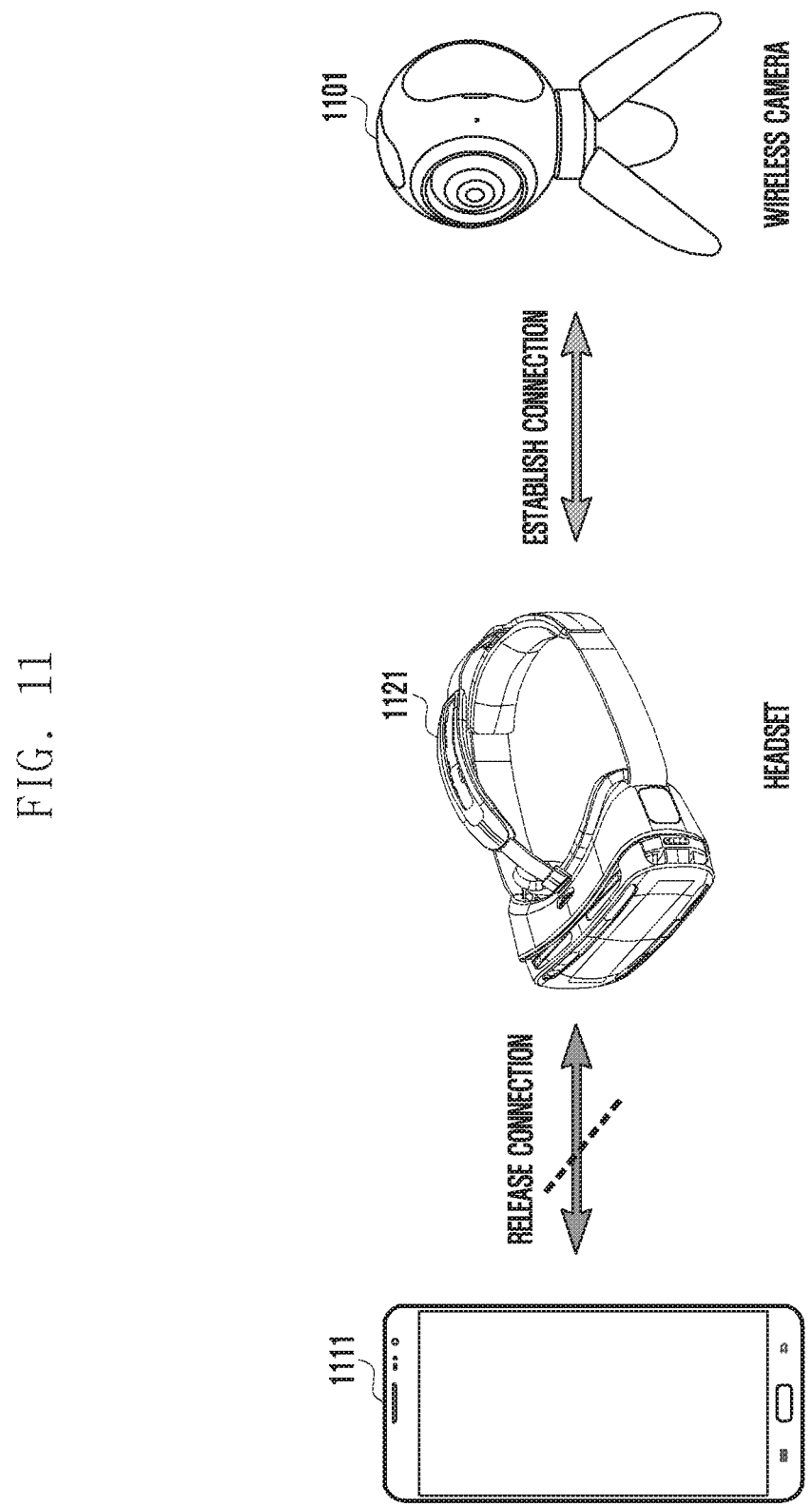

FIG. 11 is a diagram illustrating a situation where a first device 1101 cannot display devices available for use according to an embodiment of the disclosure.

For example, the first device 1101 is a wireless camera, and a third device 1121 is a headset that is capable of outputting video and voice input to the wireless camera.

Because the wireless camera as the first device 1101 is not provided with a display that is capable of displaying a device connectable to the first device 1101 as shown in FIG. 11, step S231 of FIG. 2 may be omitted; in this case, it may be preferable for the first device 1101 to be provided with a button for transmitting a connection request signal to establish a connection between the first device 1101 and the third device 1121.

Even in this case, a connection between the third device 1121 and the second device 1111 may be released based on the connection request signal transmitted by the first device.

Figure 12:
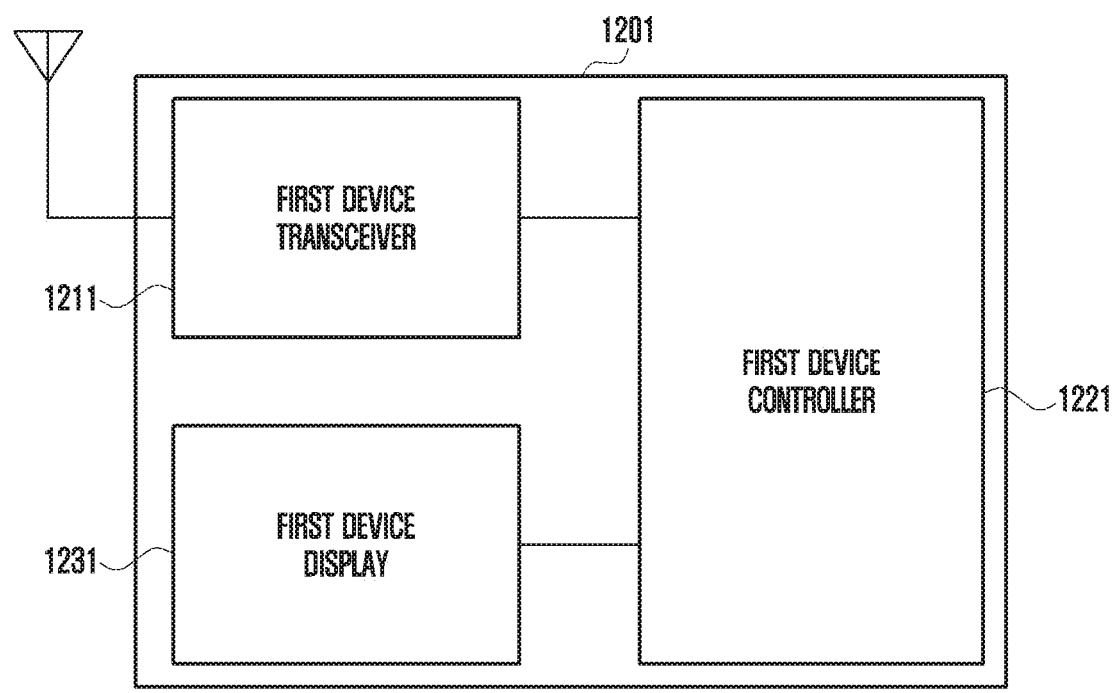
FIG. 12 is a block diagram illustrating a configuration of a first device in a short range wireless communication system according to an embodiment of the disclosure.

FIG. 12 is a block diagram illustrating a configuration of a first device 1201 in a short range wireless communication system according to an embodiment of the disclosure.

According to an embodiment of the disclosure, the first device 1201 may include a transceiver 1211 for transmitting a discovery signal including a connection information request to a second device and receiving a discovery response signal including information on a third device connected to the second device, a controller 1221 for establishing a connection to the third device based on the discovery response signal, and a display unit 1231 for displaying at least one connectable device based on the discovery response signal.

In detail, the information on the third device may include type information of the third device, and the connection information request may include type information of a device to which the first device 1201 aims to establish a connection.

If the type of the device to which the first device 1201 aims to establish a connection matches the type of the third device, the controller 1221 may automatically establish a connection with the third device based on the discovery response signal.

The transceiver 1211 of the first device 1201 may transmit a discovery signal upon power-up of the first device or execution of an application on the first device as well as according to a control for transmitting the discovery signal.

The display unit 1231 of the first device 1201 may display a list of at least one type of devices connected to the second device, and the device type list may contain devices ranked in an order of relevance to the type of the first device 1201 or an application executed on the first device 1201 or device use frequency.

The display unit 1231 of the first device may also display a tree structure composed of the second device as an upper node and at least one device as a lower node connected to the second device based on the discovery response signal.

If the third device is selected as a connection target of the first device 1201 through the display unit 1231 of the first device under any circumstance, the transceiver 1211 of the first device may transmit a connection request signal to the second device and receive a connection response signal from the second device in response to the connection request signal, and the controller 1221 of the first device may establish a connection with the third device based on the connection response signal.

Figure 13:
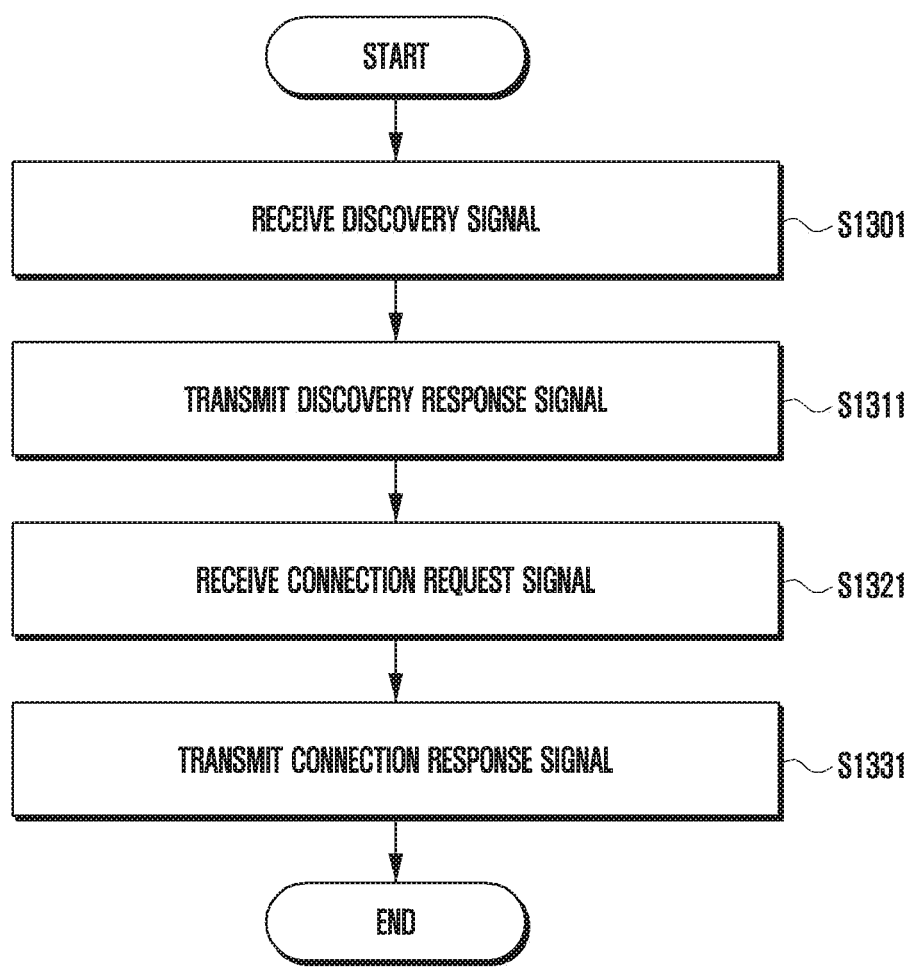
FIG. 13 is a flowchart illustrating a communication method of a second device according to an embodiment of the disclosure.

FIG. 13 is a flowchart illustrating a communication method of a second device according to an embodiment of the disclosure.

At step S1301, the second device receives a discovery signal including a connection information request from a first device; the connection information request may include information on a type of device to which the first device aims to establish a connection.

At step S1311, the second device transmits to the first device a discovery response signal including information on a third device determined based on the discovery signal; the information on the third device may include type information of the third device.

After step S1311, the second device may receive, at step S1321, a connection request signal from the first device determined based on the discovery response signal and transmit, at step S1331, a connection response signal to the first device determined based on the connection request signal.

Figure 14:
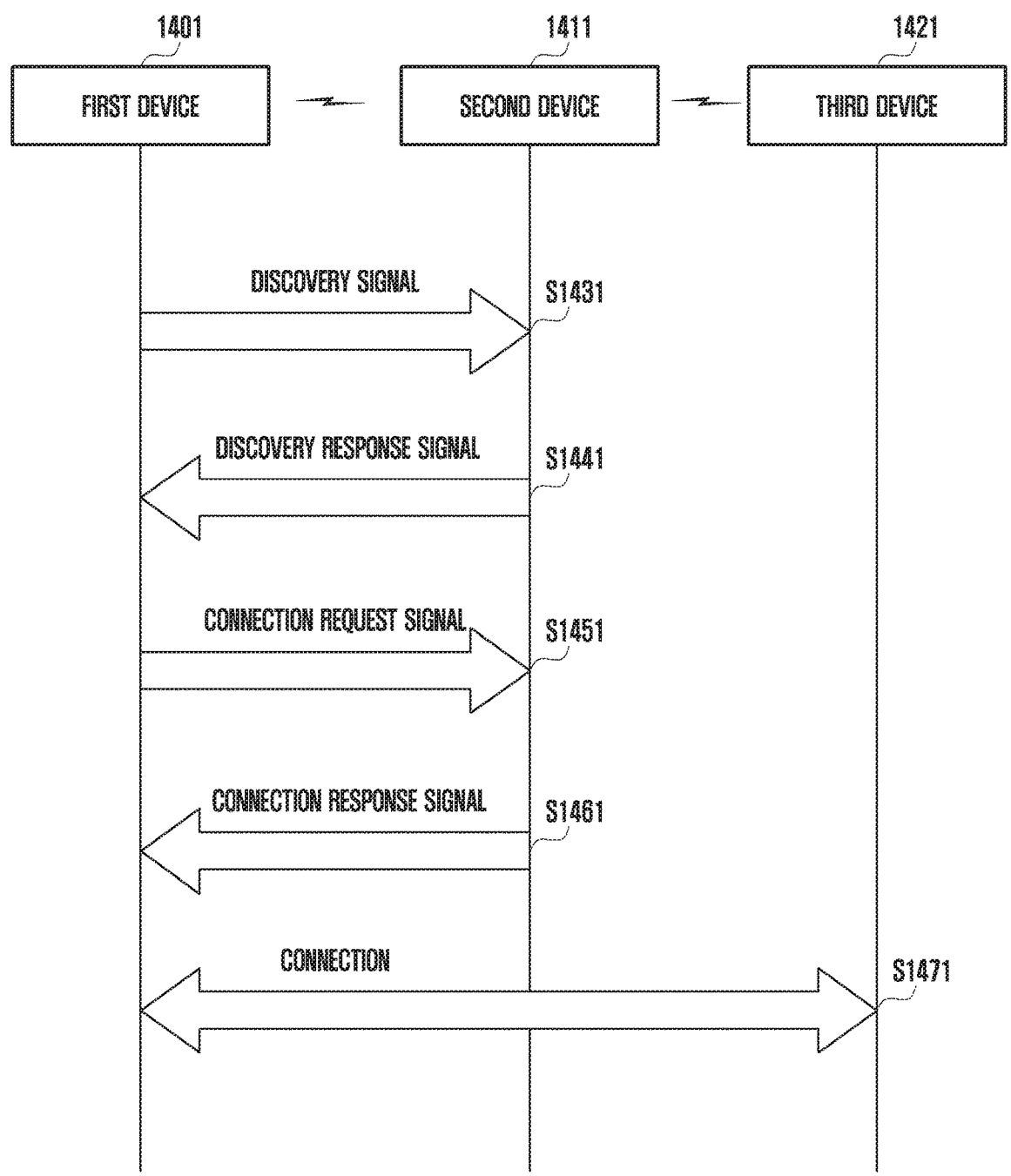
FIG. 14 is a signal flow diagram illustrating signal flows among a first device, a second device, and a third device according to an embodiment of the disclosure.

FIG. 14 is a signal flow diagram illustrating signal flows among a first device 1401, a second device 1411, and a third device 1421 according to an embodiment of the disclosure.

The first device 1401 transmits, at step S1431, a discovery signal to the second device 1411, and the second device 1411 transmits, at step S1441, a discovery response signal, including information indicating that the third device 1421 is connected to the second device 1411, to the first device 1401 in response to the discovery signal.

If the third device 1421 is selected as a connection target of the first device 1401 on the first device 1401, the first device 1401 transmits, at step S1451, a connection request signal to the second device 1411 to request for information on the third device, and the second device 1411 transmits, at step S1461, a connection response signal, including information on the third device 1421, to the first device 1401 in response to the connection request signal.

Finally, upon receipt of the information on the third device 1421 from the second device 1411 at step S1461, the first device 1401 establishes a connection with the third device 1421 at step S1471. Although not shown in the drawing, an old connection established between the second device 1411 and the third device 1421 may be released.

Figure 15:
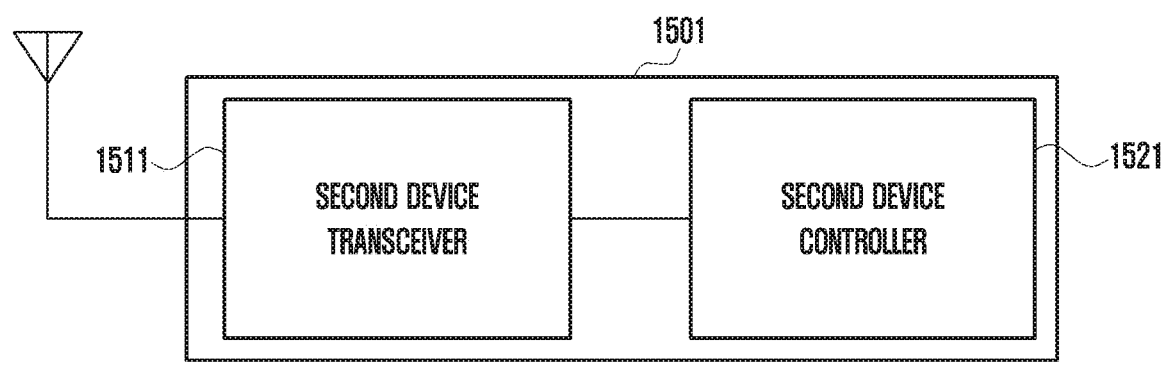
FIG. 15 is a block diagram illustrating a configuration of a second device according to an embodiment of the disclosure.

FIG. 15 is a block diagram illustrating a configuration of a second device according to an embodiment of the disclosure.

The second device 1501 may include a transceiver 1511 for receiving a discovery signal including a connection information request from a first device and transmitting a discovery response signal to the first device in response to the discovery signal and a controller 1521 for determining the discovery response signal including information on a third device based on the discovery signal.

The information on the third device may include type information of the third device, and the connection information request may include type information of a device to which the first device aims to establish a connection.

The transceiver 1511 of the second device may receive the connection request signal determined based on the discovery response signal from the first device and transmit a connection response signal to the first device, and the controller 1521 of the second device may determine the connection response signal based on the connection request signal.

The embodiments disclosed in the specification and drawings are proposed to help explain and understand the present invention rather than to limit the scope of the present invention. It is obvious to those skilled in the art that various modifications and changes can be made thereto without departing from the broader spirit and scope of the invention. If necessary, the embodiments may be combined in whole or in part. For example, embodiments 1, 2, and 3 of the disclosure may be combined, in part or whole, with each other to form an embodiment for the operations of a base station and a terminal. Although the embodiments are directed to an LTE system, it is obvious to apply them to other systems such as a 5G system or an NR system to form other alternative embodiments without departing from the spirit and scope of the disclosure.

What is claimed is:

1. A connection method of a first device in a wireless communication system, the method comprising:
    transmitting a discovery signal including a connection information request to a second device;
    receiving a discovery response signal including information on a third device connected to the second device from the second device;
    transmitting a connection request signal to the second device based on the information on the third device, in case that the third device is selected as a connection target of the first device;
    receiving a connection response signal determined based on the connection request signal from the second device; and
    establishing a connection to the third device based on the connection response signal,
    wherein the connection between the third device and the second device is released based on the connection request signal transmitted by the first device.

2. The method of claim 1, wherein the information on the third device comprises type information of the third device, the connection information request comprises type information of a device to which the first device aims to establish a connection, and establishing the connection comprises establishing, based on a type of the device to which the first device aims to establish a connection matching the type of the third device, the connection to the third device being automatic, based on the discovery response signal.

3. The method of claim 1, wherein the discovery signal is transmitted based on the first device being powered on or an application being executed on the first device.

4. The method of claim 1, further comprising authenticating the third device based on the discovery response signal.

5. The method of claim 1,
    wherein the establishing of the connection comprises:
        displaying at least one connectable device based on the discovery response signal, and
    wherein displaying the at least one device comprises:
        displaying a list of a type of at least one device connected to the second device, the device type list containing devices ranked in an order of relevance to the type of the first device or an application executed on the first device or use frequency of devices.

6. The method of claim 1, wherein the establishing of the connection comprises:
    displaying a tree structure comprising the second device as an upper node and at least one device connected to the second device as a lower node based on the discovery response signal;
    transmitting a connection request signal to the second device as the upper node based on the second device being selected as a connection target of the first device;
    receiving, from the second device, a connection response signal determined based on the connection request signal; and
    establishing connections to all of the at least one devices connected to the second device as the lower node based on the connection response signal.

7. A first device in a short range wireless communication system, the first device comprising:
    a transceiver; and
    a controller configured to:
        control the transceiver to transmit a discovery signal including a connection information request to a second device,
        control the transceiver to receive a discovery response signal including information on a third device connected to the second device from the second device,
        control the transceiver to transmit a connection request signal to the second device based on the information on the third device, in case that the third device is selected as a connection target of the first device,
        control the transceiver to receive a connection response signal determined based on the connection request signal from the second device, and
        control to establish a connection to the third device based on the connection response signal, wherein the connection between the third device and the second device is released based on the connection request signal transmitted by the first device.

8. The first device of claim 7,
wherein the information on the third device comprises type information of the third device, the connection information request comprises type information of a device to which the first device aims to establish a connection, and
wherein the controller is further configured to control to establish, based on a type of the device to which the first device aims to establish a connection matching the type of the third device, the connection to the third device being automatic, based on the discovery response signal.

9. The first device of claim 7, wherein the transceiver is further configured to transmit the discovery signal based on the first device being powered on or an application being executed on the first device.

10. The first device of claim 7, wherein the controller is further configured to control to authenticate the third device based on the discovery response signal.

11. The first device of claim 7, further comprising a display configured to display at least one connectable device based on the discovery response signal,
wherein the display is further configured to display a list of a type of at least one device connected to the second device, the device type list containing devices ranked in an order of relevance to the type of the first device or an application executed on the first device or use frequency of devices.

12. The first device of claim 7, further comprising a display configured to display a tree structure comprising the second device as an upper node and at least one device connected to the second device as a lower node based on the discovery response signal,
wherein the transceiver is further configured to transmit a connection request signal to the second device as the upper node based on the second device being selected as a connection target of the first device and receive, from the second device, a connection response signal determined based on the connection request signal, and
wherein the controller is further configured to control to establish connections to all of the at least one devices connected to the second device as the lower node based on the connection response signal.

13. A communication method of a second device connected to a third device and communicating with a first device in a short range wireless communication system, the method comprising:

receiving a discovery signal including a connection information request from the first device; and
transmitting, to the first device, a discovery response signal including information on the third device determined based on the discovery signal;
receiving, from the first device, a connection request signal based on the information on the third device;
transmitting, to the first device, a connection response signal determined based on the connection request signal; and
releasing a connection between the third device and the second device based on the connection request signal transmitted by the first device,
wherein the connection between the third device and the first device is established based on the connection response signal.

14. The method of claim 13,
wherein the information on the third device comprises type information of the third device, and the connection information request comprises type information of a device to which the first device aims to establish a connection.

15. A second device connected to a third device and communicating with a first device in a short range wireless communication system, the second device comprising:
a transceiver; and
a controller configured to control to:
control to the transceiver to receive a discovery signal including a connection information request from the first device,
control to the transceiver to transmit, to the first device, a discovery response signal including information on the third device determined based on the discovery signal,
control to the transceiver to receive, from the first device, a connection request signal based on the information on the third device,
control to the transceiver to transmit, to the first device, a connection response signal determined based on the connection request signal, and
release a connection between the third device and the second device based on the connection request signal transmitted by the first device,
wherein a connection between the third device and the first device is established based on the connection response signal.

\* \* \* \* \*